United States Patent [19]

Hayashida et al.

[11] Patent Number: 4,774,809
[45] Date of Patent: Oct. 4, 1988

[54] TANDEM TYPE MASTER CYLINDER WITH PRESSURE PROPORTIONING VALVE DEACTIVATED BY A SLIDABLE ACTUATING MEMBER

[75] Inventors: Yoshihiro Hayashida; Masami Aono; Yoshihiro Nakamura, all of Kanagawa; Takashi Ishimaki, Tokyo, all of Japan

[73] Assignee: Tokico Ltd., Tokyo, Japan

[21] Appl. No.: 4,803

[22] Filed: Jan. 12, 1987

Related U.S. Application Data

[63] Continuation-in-part of Ser. No. 826,387, Feb. 5, 1986, abandoned.

[30] Foreign Application Priority Data

Feb. 9, 1985 [JP] Japan .............................. 60-17279[U]
May 20, 1985 [JP] Japan .............................. 60-74485[U]
Jan. 10, 1986 [JP] Japan .............................. 61-1718[U]

[51] Int. Cl.⁴ .......................... F15B 7/00; B60T 11/20; B60T 13/00
[52] U.S. Cl. ......................................... 60/591; 60/562
[58] Field of Search ................. 60/562, 569, 586, 587, 60/589, 591; 303/6 C; 188/349; 137/495, 505.13, 505.25

[56] References Cited

U.S. PATENT DOCUMENTS

| | | | |
|---|---|---|---|
| 2,526,457 | 10/1950 | Bradbury | 60/589 |
| 3,493,270 | 2/1970 | Doerfler | 303/6 C |
| 3,922,857 | 12/1975 | Carey | 303/6 C X |
| 3,970,347 | 7/1976 | Mizusawa | 303/6 C |
| 4,154,260 | 5/1979 | Shutt | 60/591 X |
| 4,213,655 | 7/1980 | Brademeyer | 60/591 X |
| 4,319,456 | 3/1982 | Kubota | 60/562 |
| 4,331,363 | 5/1982 | Berisch | 303/6 C |
| 4,437,310 | 3/1984 | Morita et al. | 60/591 X |
| 4,477,122 | 10/1984 | Hayashida | 303/6 C |

FOREIGN PATENT DOCUMENTS

| | | | |
|---|---|---|---|
| 0157158 | 10/1985 | European Pat. Off. | 60/591 |
| 3684178 | 9/1986 | Fed. Rep. of Germany . | |
| 56-43055 | 4/1981 | Japan | 60/589 |
| 58-3851 | 1/1983 | Japan . | |
| 60-135355 | 7/1985 | Japan . | |
| 133461 | 8/1986 | Japan . | |
| 189872 | 11/1986 | Japan . | |

*Primary Examiner*—Robert E. Garrett
*Assistant Examiner*—George Kapsalas
*Attorney, Agent, or Firm*—Wenderoth, Lind & Ponack

[57] ABSTRACT

A tandem type master cylinder for use in a vehicle hydraulic brake system and having a pressure proportioning valve integrally connected thereto includes a piston slidably received in a bore in the master cylinder and defining a pressure chamber at least on one side thereof, and an actuating member or a slide slidable in directions parallel to the piston and having a sensing end and an actuating end projecting respectively from opposite surfaces thereof. The sensing end passes through a slit formed in the circumferential wall of the bore to project into the pressure chamber in the master cylinder. The actuating end cooperates with a valve member of the pressure proportioning valve such that when the piston is displaced beyond a predetermined normal reciprocating stroke the actuating member is slidingly displaced to tilt the valve member, thereby deactivating the pressure proportioning valve.

3 Claims, 9 Drawing Sheets

TANDEM TYPE MASTER CYLINDER WITH PRESSURE PROPORTIONING VALVE DEACTIVATED BY A SLIDABLE ACTUATING MEMBER

This application is a continuation-in-part of now abandoned application Ser. No. 826,387, filed Feb. 5, 1986.

BACKGROUND OF THE INVENTION

This invention relates to a master cylinder for use in a hydraulic braking system of a vehicle such as an automobile and, particularly to a tandem type master cylinder incorporating a hydraulic pressure control valve.

A tandem type master cylinder incorporating a hydraulic pressure control valve has been proposed and widely utilized in a hydraulic braking system of a vehicle. The tandem master cylinder supplies pressurized fluid to two independent braking circuits such as a front wheel circuit and a rear wheel circuit. The pressure control valve controls the pressure in the rear wheel circuit as compared with the front wheel circuit. U.S. Pat. Nos. 3,970,347 and 4,477,122, Japanese Patent Publication No. 58-3851 and Japanese Patent Public Disclosure No. 60-135355 are typical examples of such prior art arrangements.

Typically, the pressure control valve or pressure proportioning valve includes a differential pressure piston working in a bore and having different pressure receiving areas on opposite ends thereof, an axial passage provided in the piston and a valve member cooperating with one end of the passage. A chamber facing a small end or an end having a small effective pressure receiving area (inlet chamber) is connected to the outlet port of the master cylinder, and a chamber facing a large end or an end having a large effective pressure receiving area (outlet chamber) is connected to the rear wheel circuit. When the pressure supplied to the valve mechanism exceeds a predetermined level, the piston moves toward the small end and the valve member cuts off the communication between the chambers (a cut-off pressure). When the pressure in the inlet chamber further increases, the piston moves toward the outlet chamber to permit a small amount of liquid flow from the inlet chamber to the outlet chamber and returns to valve closing position, whereby the pressure in the outlet chamber increases at a reduced rate as compared with the pressure in the inlet chamber.

U.S. Pat. No. 3,970,347 discloses a brake pressure control valve for use with a dual type brake master cylinder and connected to two independent pressure circuits. The valve comprises an elongated housing having an axial bore therein, and two pressure proportioning valve mechanisms are provided in the opposite end portions of the bore in mutually aligned relationship. The valve further includes a failure warning mechanism including a balance piston arranged between the two differential pistons of the pressure proportioning mechanisms and being displaceable to actuate an electric switch when a failure such as a fluid leakage exists in one of the pressure circuits.

However, these prior art devices have a shortcoming such that even when there exists a failure such as a liquid leakage in the front circuit the pressure proportioning valve in the rear wheel circuit controls the brake pressure applied to rear wheels similarly to the normal operating condition, whereby the braking force acting on the vehicle is reduced about one fourth and, accordingly, it is required to apply an excessibly large braking force on a brake pedal for safely stopping the vehicle.

For preventing the aforesaid shortcoming, an actuating member has been provided to deactivate or open the control valve in response to failure in either one of the braking circuits. According to prior art devices, the actuating member comprises a tiltable element or a transversely displaceable element and one end of the element projects transversely through a circumferential wall of a cylinder for engaging with a piston or a plunger received in the cylinder. When the piston or the plunger is a member separate from the master cylinder such as shown in U.S. Pat. No. 4,447,122, the size of the master cylinder must be increased and the hydraulic system is complicated. The tiltable element according to the prior art requires a relatively large amount of displacement for the piston or the plunger for reducing the torque acting on the pivot of the tiltable element and improving the strength or rigidity of the tilting element.

SUMMARY OF THE INVENTION

The present invention aims to overcome the aforesaid shortcoming and provides a tandem type master cylinder for use in a vehicle hydraulic brake system and having a pressure proportioning valve integrally connected thereto, which comprises a piston slidably received in a bore in the master cylinder and defining a pressure chamber at least on one side thereof, and an actuating member slidable in directions parallel to the piston and having a sensing end and an actuating end projecting respectively on opposite surfaces thereof, the sensing end projecting into the pressure chamber in the cylinder by passing through a slit formed in the circumferential wall of the bore, the actuating end cooperating with a valve member of the pressure proportioning valve such that when the piston is displaced beyond a predetermined normal reciprocating stroke the actuating member is slidingly displaced to tilt the valve member, thereby deactivating or opening the pressure proportioning valve.

The actuating member or a slide acts to tilt the valve member of the pressure proportioning valve, and thus, a relatively small displacement of the slide can reliably prevent the pressure proportioning valve from its normal operation.

BRIEF DESCRIPTION OF THE DRAWINGS

The invention will hereinafter be explained in detail with reference to the accompanying drawings exemplifying preferred embodiments of the invention, and in which.

DETAILED DESCRIPTION OF THE PREFERRED EMBODIMENTS

Now, description will be made with respect to a first embodiment according to the invention illustrated in FIG. 1–FIG. 7. Shown at 1 is a generally tubular main body of a tandem type master cylinder, which receives therein a primary piston 2 and a secondary piston 3. A first pressure chamber 4 is formed between the primary piston 2 and the secondary piston 3, and a second pressure chamber 5 is formed between the secondary piston 3 and a closed bottom of the main body 1. The first pressure chamber 4 is communicated with a rear wheel brake circuit through a pressure proportioning valve 24 which is integrally connected (not shown in FIG. 2) to the main body 1 and will be explained hereinafter. The second pressure chamber 5 is communicated with a front wheel brake circuit. A spring 7 is interposed between the primary and secondary pistons 2 and 3, and a generally tubular retainer 6 is clamped between one end of the spring 7 and the secondary piston 3. The tubular portion of the retainer 6 surrounds loosely a part of the spring 7, and a radially outwardly extending flange 6a is formed on the retainer 6 at one end thereof remote from the secondary piston 3. A spring 8 is interposed between the secondary piston 3 and the closed bottom of the main body 1.

Figure 1:
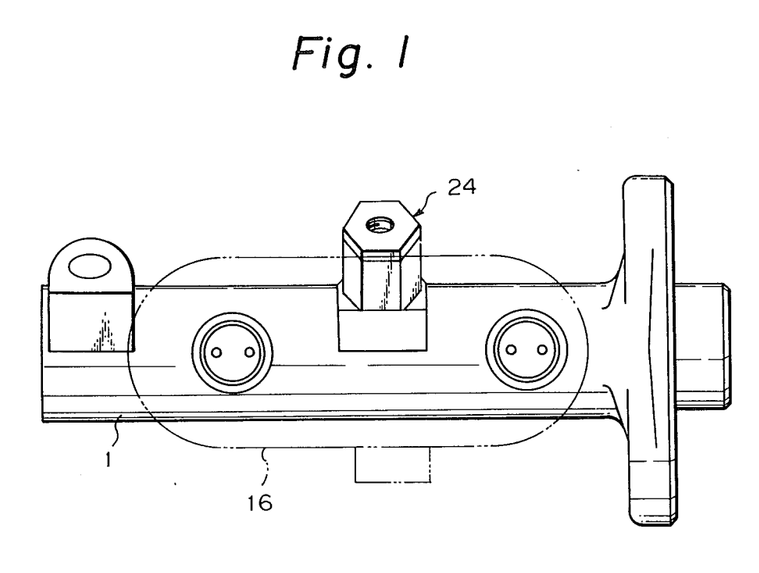
FIG. 1 is a plan view of a master cylinder according to the invention.
Figure 2:
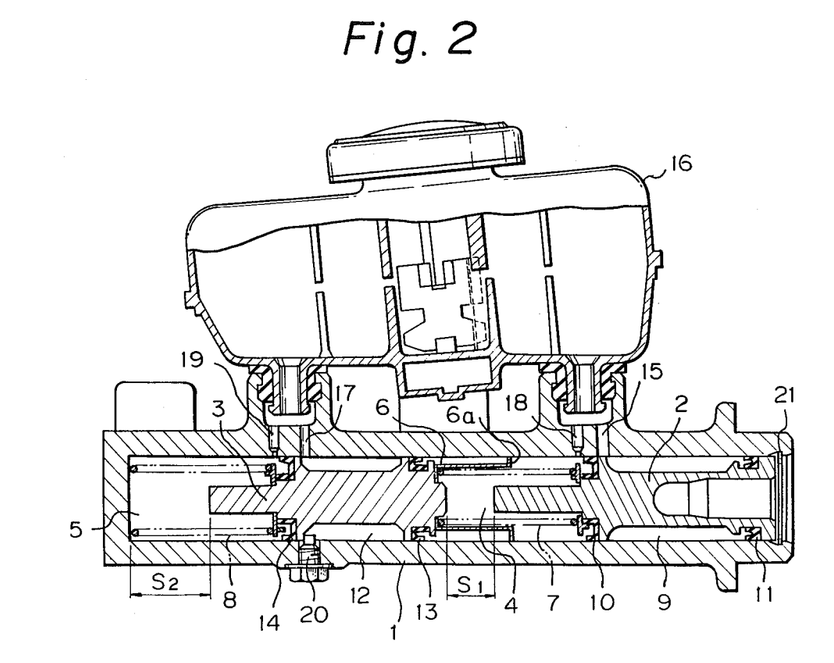
FIG. 2 is a longitudinal section of the master cylinder of FIG. 1.

A first supply chamber 9 is formed between the inner circumference of the main body 1 and an annular recess formed in the outer circumference of the primary piston 2 as shown in FIG. 2, and, seals 10 and 11 are arranged on axial opposite ends of the chamber 9. Similarly, a second supply chamber 12 is formed between the inner circumference of the main body 1 and an annular recess formed in the outer circumference of the secondary piston 3, and seals 13 and 14 are arranged on axial opposite ends of the chamber 12. The first supply chamber 9 is communicated with a reservoir 16 through a port 15 and the second supply chamber 12 is communicated with the reservoir 16 through a port 17. The reservoir 16 is mounted on the main body 1 as shown in FIGS. 1 and 2. The first and second pressure chambers 4 and 5 are communicated with the reservoir 16 through ports 18 and 19 respectively at non-actuated condition of the master cylinder shown in FIG. 2. Shown at $S_1$ and $S_2$ in FIG. 2 are clearances formed respectively between the primary piston 2 and the secondary piston 3 and between the secondary piston 3 and the bottom of the main body 1 at the non-actuated condition of the master cylinder. It will be noted that the normal operating stroke of the primary piston 2 is larger than the clearance $S_1$ and that of the secondary piston 3 is definitely smaller than the clearance $S_2$. Shown at 20 is a stop bolt defining the non-actuated position of the secondary piston 3 and, at 21 is a retaining ring defining the non-actuated position of the primary piston 2.

Figure 3:
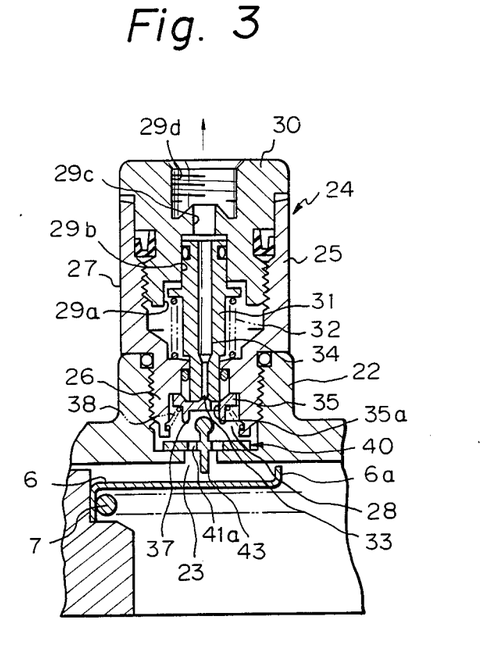
FIG. 3 is a partial longitudinal sectional view of FIG. 1 taken along an axis of a pressure proportioning valve thereof.
Figure 6:
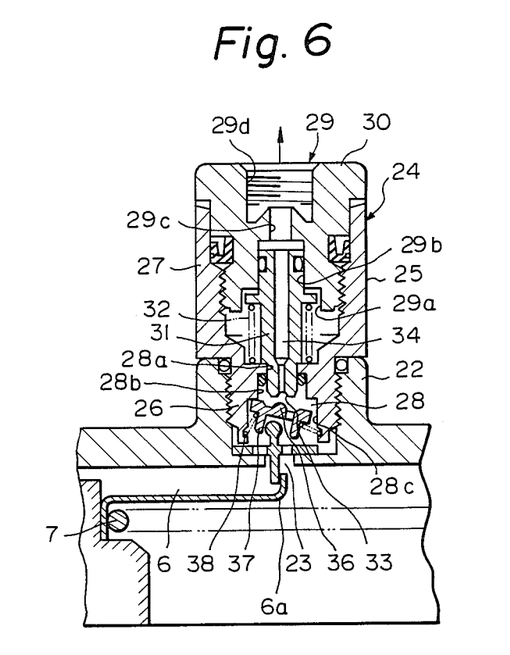
FIG. 6 is a view similar to FIG. 3 but showing the condition whereat the slider has been moved to deactivate the pressure proportioning valve.

A tubular outlet port 22 is integrally formed on the side wall of the main body 1 as shown in FIG. 3 to communicate the first pressure chamber 4 with, preferably, a rear wheel brake circuit. The second pressure chamber 5 is connected with another wheel brake circuit, such as a front wheel brake circuit, through another outlet port (not shown) formed on the main body 1. The outlet port 22 is communicated with the pressure chamber 4 through a slit 23 formed in the side wall of the main body 1. A pressure proportioning valve 24 is mounted on the outlet port 22 and comprises, as shown in FIG. 3, a tubular housing 25 consisting of a small diameter portion 26 and a large diameter portion 27, with the small diameter portion 26 being screwed into the inner circumference of the outlet port 22 thereby mounting the valve 24 on the main body 1. A stepped bore 28 is formed in the small diameter portion 26 and consists of, as shown in FIG. 6, a small diameter portion 28a, a medium diameter portion 28b and a large diameter portion 28c sequentially from the top to the bottom. On the inner circumference of the large diameter portion 27 of the housing 25, a tubular adapter 30 having a stepped bore 29 is screw-threadingly connected. The stepped bore 29 consists of a large diameter portion 29a, a medium diameter portion 29b, small diameter portion 29c and a threaded large diameter portion 29d sequentially in the direction separating from the main body 1 as shown in FIG. 3. A pipe line (not shown) is connected to the threaded large diameter portion 29d to communicate with rear wheel brake cylinders (not shown).

An actuating piston 31 is slidably fitted in the medium diameter portion 29b of the adapter 30 and in the small diameter portion 28a in the housing 25. A return spring 32 acts on the piston 31 to bias it in the direction separating from the main body 1. A valve seat 33 is formed on an end surface of the piston 31 on the side of the main body 1, and the pressure receiving area of the piston 31 on the side of the valve seat 33 (or the diameter of the bore portion 28a) is smaller than that of the side remote from the main body 1 (or the diameter of the bore portion 29b). A communicating passage 34 is formed through the piston 31, with one end thereof opening to the interior of the small diameter portion 26 and, the other end thereof opening to the interior of the adapted 30 through the medium diameter bore 29b and the small diameter bore 29c to the interior of the threaded diameter portion 29d.

Figure 8:
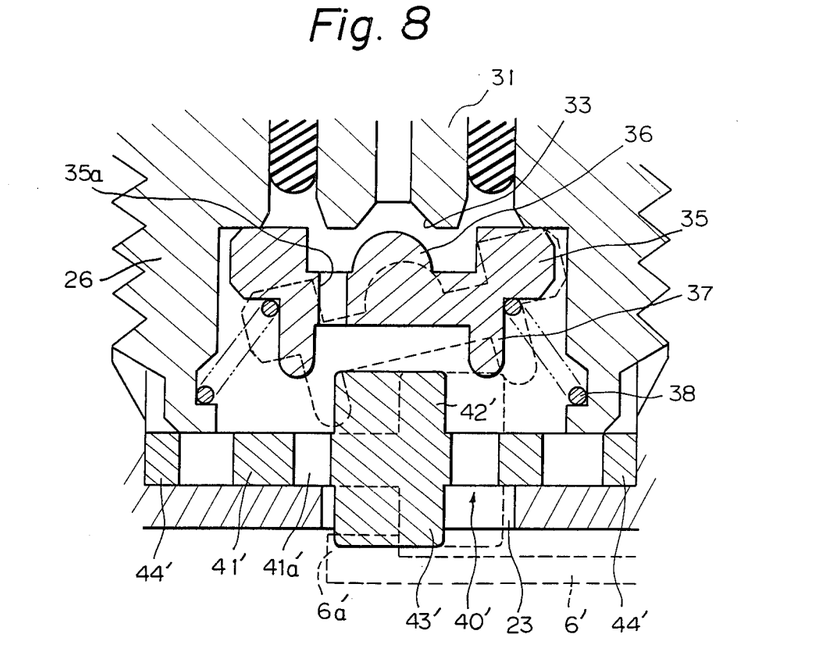
FIG. 8 is an enlarged view similar to FIG. 6 but showing a second embodiment.

A valve member 35 having generally a disc-like configuration is disposed in the large diameter bore portion 28c to cooperate with the valve seat 33 on the actuating piston 31. A valve portion 36 is formed on one side surface of the valve member 35 and a generally tubular projection 37 is formed on the other side surface of the valve member 35 with the diameter thereof being smaller than the valve member 35. The diameter of the valve member 35 is larger than the medium diameter bore portion 28b and is smaller than the large diameter bore portion 28c, and the peripheral edge portion of the valve member 35 is adapted to abut with a diametrical step formed between the medium diameter bore portion 28b and the large diameter bore portion 38c. A spring 38 is disposed in the large diameter bore portion 28c to bias the valve member 35 against the diametrical step. Three circumferentially spaced openings 35a (only one is shown in FIGS. 3, 6 and 8) are formed through the valve member 35 to communicate permanently the chamber defined by the large diameter bore portion 28c with the chamber defined by the medium diameter bore portion 28b.

Figure 4:
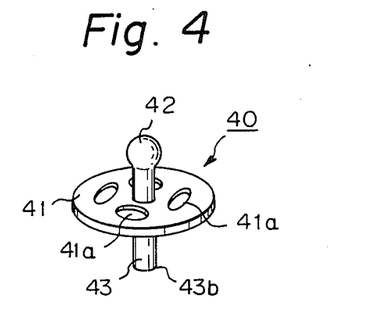
FIG. 4 is a perspective view of a slider shown in FIG. 3.

A slider 40 is disposed in the outlet port 22 and comprises, as shown in FIG. 4, a disc shaped portion 41 having a plurality or through holes 41a, oppositely projecting projections 42 and 43 acting respectively as an actuating end and a sensing end according to the invention. The projection 43 extends through the slit 23 and into the interior of the pressure chamber 4 to cooperate with the flange portion 6a of the tubular member 6. The disc like shaped portion 41 of the slider 40 is slidable along the bottom of the outlet port 22 in directions parallel to the axis of the master cylinder, and the holes 41a in the slider 40 permanently communicate the pressure chamber 4 with the interior of the outlet port 22 through the slit 23. Projection 42 has a spherical end and extends into the tubular portion 37 of the valve member 35 to co-act therewith.

OPERATION (1) Normal Condition

Figure 5:
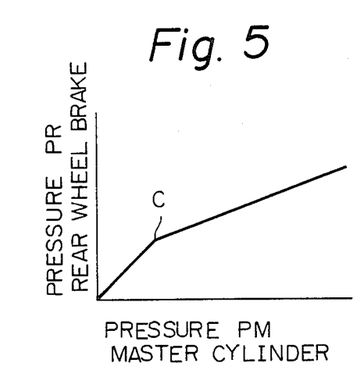
FIG. 5 is a characteristic diagram of the master cylinder of FIG. 1 in the normal operating condition.

When the front and rear wheel brake circuits are in the normal condition and, when the primary piston 2 is displaced leftwards in FIG. 2 by such as depressing a brake pedal, the primary and the secondary pistons 2 and 3 move leftwards against the spring force of springs 7 and 8, whereby the liquid in the first and second pressure chambers 4 and 5 is pressurized to generate the same pressure $P_M$. When the pressure $P_M$ is low, the piston 31 is displaced upwards as viewed in FIG. 3 by the biasing force of the spring 32 such that the valve seat 33 on the piston 31 is separated from the valve member 35, and the rear wheel brake circuit is connected with the first pressure chamber 4 through the slit 23 in the wall of the cylinder 1, openings 41a in the slider 40, the holes 35a in the valve member 35, the space between the valve member 35 and the valve seat 33, the bore 34 in the piston 31, and the bore portions 29c and 29d in the adaptor 30. The piston 31 moves downward in response to an increase of the pressure $P_M$ since the pressure receiving area of the piston 31 in the bore portion 29b is larger than that in the bore portion 28a. At a predetermined pressure C as shown in FIG. 5, the valve seat 33 of the piston 31 engages with the valve member 35 and the communication between the bore 34 and the pressure chamber 4 is cut off. The point C is usually called the "cut off point". Thereafter, the piston 31 reciprocally moves upwards and downwards in response to further increases in the liquid pressure in the pressure chamber 4, and the pressure in the rear wheel brake circuit increases at a predetermined reduced rate relative to the pressure $P_M$. The front wheel brake circuit is connected to the second pressure chamber 5, and thus the pressure $P_M$ in the master cylinder is supplied to the front wheel brake circuit directly.

Figure 7:
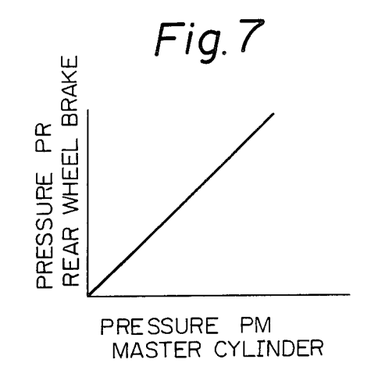
FIG. 7 is a characteristic diagram corresponding to the condition of FIG. 6.

(2) When the rear wheel brake circuit is normal and the front wheel brake circuit has failed When the primary piston 2 is moved leftward against the force of springs 7 and 8, the secondary piston 3 does not generate any substantial pressure in the pressure chamber 5. Thus, when the pressure in the first pressure chamber 4 increases to a predetermined pressure which is lower than the aforesaid "cut off pressure" C, the secondary piston 3 displaces over the normal stroke and engages with the bottom of the main body 1. The end portion or projection 43 of the slider 40 engaged by the flange 6a of the tubular member 6 and the slider 40 is moved slidingly in the leftward direction as viewed in FIG. 6. The spherical end 42 of the slider 40 engages with the tubular portion 37 of the valve member 35 so that the valve member 35 is tiltingly moved as shown in FIG. 6. Thus, the valve seat 33 of the piston 31 is prevented from engaging with the valve member 35 regardless of the movement of the piston 31. The liquid pressure $P_M$ in the first pressure chamber 4 thus continually is directly transmitted to the rear wheel brake circuit. FIG. 7 shows the relationship between the pressure in the rear wheel brake circuit and the first pressure chamber 4 at that condition.

(3) The front wheel brake circuit is normal and the rear wheel brake circuit has failed.

The pressing force applied on the primary piston 2 is transmitted to the secondary piston 3 through the spring 7 or directly due to abutment between the primary and secondary pistons 2 and 3. The pressure chamber 4 does not generate any pressure, but the pressure chamber 5 acts to generate normal liquid pressure $P_M$ which is transmitted to the front wheel circuit.

In the above embodiment, to deactivate the proportioning valve 24 in case of a failure in the front wheel brake circuit, the slider 40 is provided to sense excess movement of the secondary piston 3 and the spherical end 42 of the slider 40 act to apply a rotating force to the valve member 35 through the engagement between the tubular portion 37 of the valve member 35 and the spherical end or projection 42 of the slider 40, and thus, a relatively small sliding movement of the slider 40 can effectively separate the valve member 35 from the valve seat 33. Accordingly, it is possible to reduce the axial length of the slit 23. As compared with a conventional tilt type actuating member, it is possible to reduce substantially the amount of axial movement of the primary or secondary piston 2 or 3 necessary to deactivate the pressure proportioning valve. Further, according to the invention, it is possible to adjust the axial location of the pressure proportioning valve as desired. Further, the slider 40 does not normally contact the valve member 35, and thus, the normal operation of the pressure proportioning valve is not affected by movement of the slider caused by vibrations and the like. Further, the amount or the length of the sensing end 43 of the slider projecting into the bore of the master cylinder can be minimized, while, according to the extent of tilting, the projecting amount changes in response to the tilting angle. The axial length of the slit 23 can be minimized, which is advantageous in preventing seals 13 or 14 from damage when assembling the master cylinder.

Further, the invention is of simple construction and is easy to assemble, since the slider 40 is formed separately from the pressure proportioning valve 24 and some clearance is provided in the normal condition, between the slider 40 and the valve member 35 of the pressure proportioning valve. Further, the strength of the slider 40 and the valve member 35 are improved as compared with an integral type prior art device, since the length thereof can be minimized according to the invention.

Figure 9:
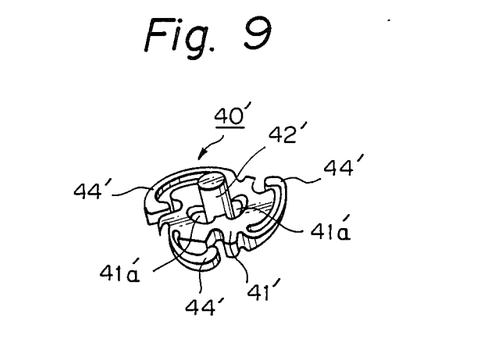
FIG. 9 is a perspective view of the slide shown in FIG. 8.
Figure 10:
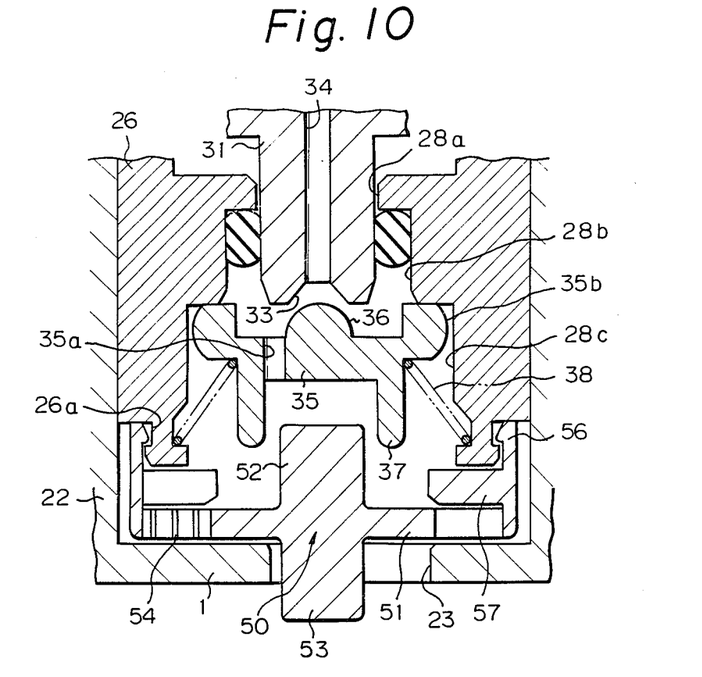
FIG. 10 is an enlarged view similar to FIG. 3 but showing a third embodiment of the invention.
Figure 11:
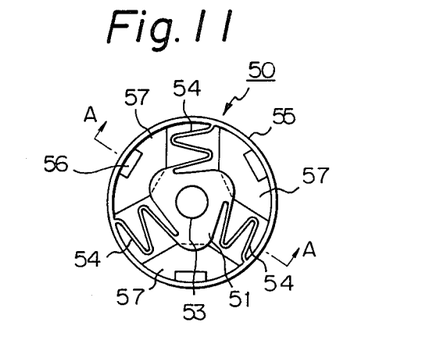
FIGS. 11, 12 and 13 are a plan view, a side view and a sectional view respectively of a slide according to the third embodiment of the invention.
Figure 12:
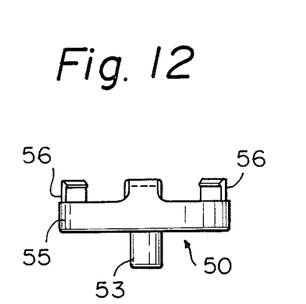
Figure 13:
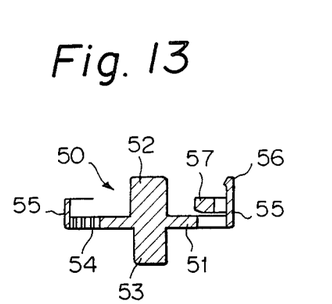

FIGS. 8 and 9 show a second embodiment according to the invention. In the first embodiment, the slider 40 returns from the condition of FIG. 6 to the condition of FIG. 3 by the spring force of the spring 38 acting through the valve member 35. According to the second embodiment, a slider 40' includes a plurality of resilient pieces 44' integrally connected to a disc shaped portion 41'. In FIG. 8, shown at broken lines is the open or deactivated position of the valve member 35, the slider 40' and the tubular member 6' which is connected to the secondary piston 3 in FIG. 3. It will be noted that FIG. 8 shows the left and right sides opposite to FIG. 6. The resilient pieces 44' act to reliably and quickly return the slider 40' to its normal position.

FIGS. 10-13 show a third embodiment of the invention, wherein the construction of the slider 40 in the first embodiment is modified. The master cylinder 1 and the proportioning valve 24 are generally similar to the preceding embodiments, and thus are shown only partially and description thereof is omitted. A slide 50 in the third embodiment is of a generally ring shape consisting of a generally ring shaped portion 55 on the outer circumference thereof, oppositely projecting sensing 53 and actuating end 52 extending along the central axis of the ring shaped portion 55, a disc shaped portion 51 surrounding the projecting ends 52 and 53, and resilient portions 54 integrally connecting the disc shaped portion 51 to the ring shaped portion 55 for permitting resilient radial displacement of the disc shaped portion 51 relative to the ring shaped portion 55. Further, three circumferentially spaced guide walls 57 are integrally formed on the inner circumference of the ring shaped portion 55 to guide the disc shaped portion 51 when the disc shaped portion 51 is displaced radially against the resiliency of the resilient portions 54 so as to reliably guide the disc shaped portion 51 when the sensing end 53 engages with such as the radial flange 6a of the tubular member 6, shown in FIG. 2. Pawls 56 extend upwards from the ring shape portion 55 and resiliently engage with an annular recess 26a which is formed in the outer circumference of the small diameter portion 26 of the tubular housing 25 (FIG. 3) of the pressure proportioning valve 24. In short, according to this embodiment, the slider 50 consists of an outer peripheral portion (55, 56 and 57) which is fixedly retained on the lower end of the tubular housing 25 of the valve 24, a slidable portion (51, 52 and 53) connected to the outer peripheral portion through resilient portions 54. Thus, the assembling operation is very easy, and further, the disc shaped portion 51 is guided between the guide walls 57 and the outer surface of the main body 1 when the slidable portion is displaced by engaging with the radial flange 6a of the tubular member 6 (FIG. 3), which effectively prevents the slidable portion from inclination. Further, in this embodiment, the valve member 35 has an arcuate surface 35b on the outer circumference for acting as a fulcrum when the valve member 35 is actuated by the actuating end 52 of the slider 50.

Figure 14:
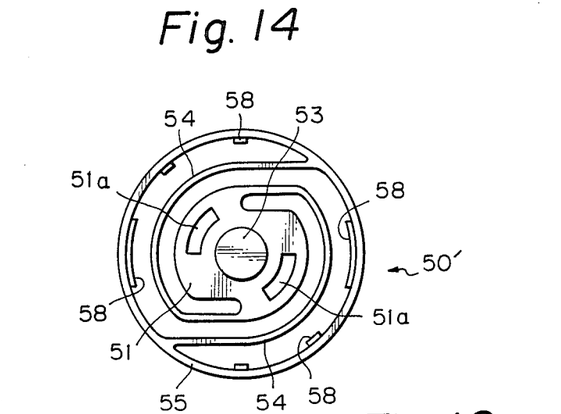
FIGS. 14, 15 and 16 are respectively a plan view, a side sectional view and a side view according to a fourth embodiment of the invention.
Figure 15:
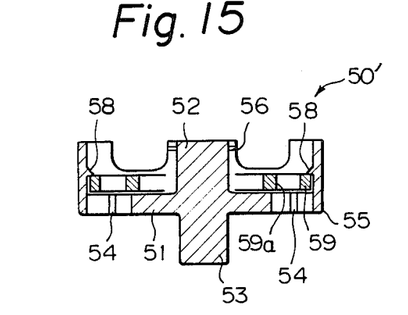
Figure 16:
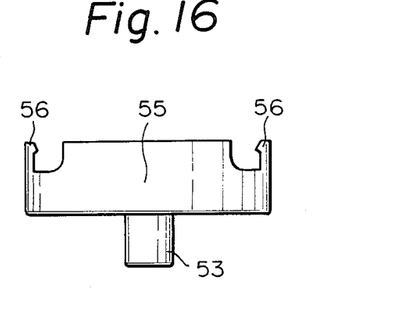

FIGS. 14-16 show a fourth embodiment which is generally similar to the third embodiment shown in FIGS. 10-13 and, corresponding parts are denoted by the same reference numerals and detailed description thereof is omitted. In this embodiment, a plurality of projections 58 are formed on the inner circumference of the ring shaped portion 55 to retain an annular disc 59 so as to guide the sliding movement of the disc shaped portion 51. The configuration of the resilient portions 54 is modified as clearly shown in FIG. 14. Shown at 51a and 59a are through holes formed respectively in the disc shaped portion 51 and the annular disc 59.

Figure 17:
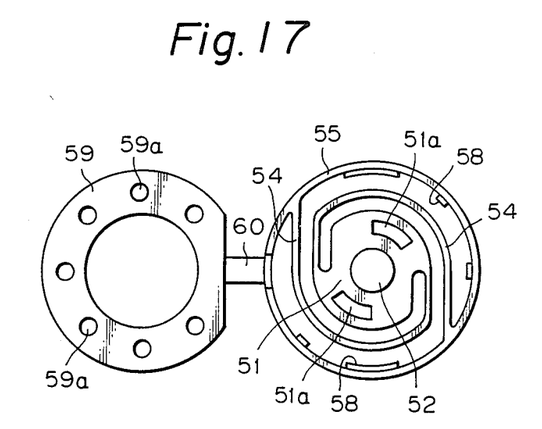
FIGS. 17 and 18 are views similar respectively to the fourth embodiment of FIGS. 14 and 15 but showing a fifth embodiment.
Figure 18:
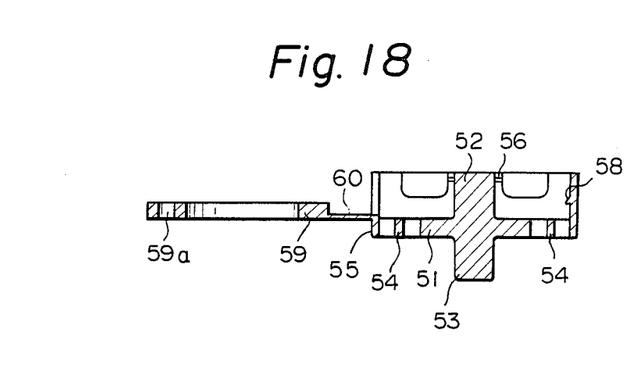

FIGS. 17 and 18 show a fifth embodiment wherein the slide 50' in the fourth embodiment is integrally formed of such as synthetic resin material. The ring portion 55 and the annular disc 59 in the fourth embodiment are connected together by a connecting portion 60. In assembling the slide, the connecting portion 60 is bent to permit the annular disc 59 to be assembled with the ring portion 55. If desired, the connecting portion 60 is cut off after the assembling operation.

Figure 19:
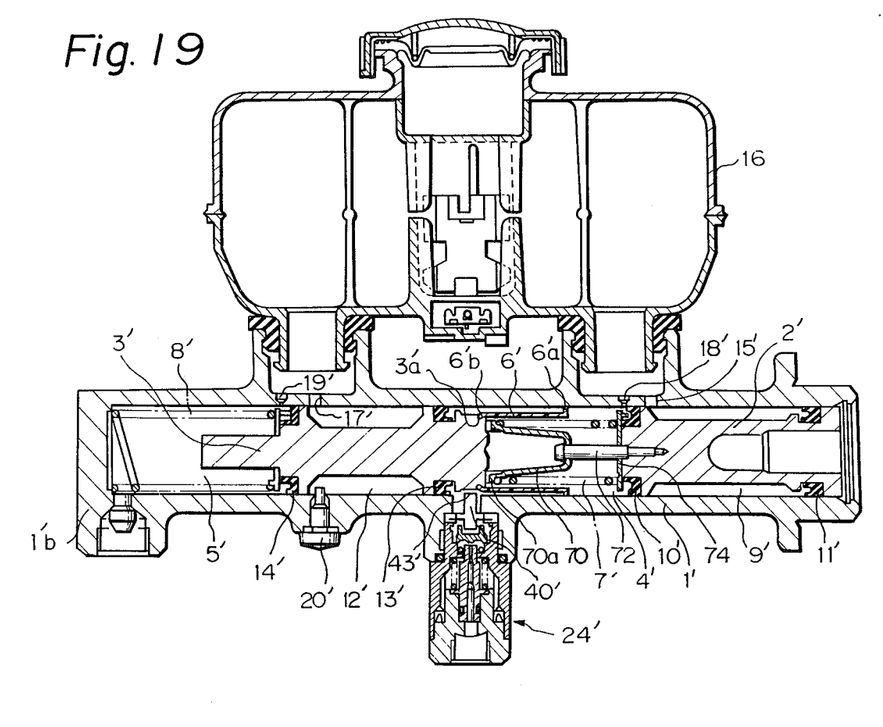
FIG. 19 is a longitudinal section similar to FIG. 2 but showing a sixth embodiment of the invention.

Referring to FIG. 19, description will be made with respect to a sixth embodiment which is generally similar to the first embodiment shown in FIGS. 1-7. Corresponding parts are denoted by the same reference numerals with prime appended thereto and detailed description thereof is omitted. In the first embodiment, the tubular retainer 6 made of metal is forced and held by the spring 7. Therefore, the retainer is likely to shake and to scratch the inner surface of the bore in the main body 1. To prevent this scratching, it is desirable to make the outer diameter of the flange 6a of the retainer 6 smaller so that the clearance between the flange 6a and the inner surface of the bore may be made greater. The flange 6a, however, needs to assuredly engage with the sensing end 43 of the slider 40 when the secondary piston 3 is displaced beyond the predetermined stroke. This fact sets a limit on the amount by which the diameter of the flange 6a can be reduced.

A main feature of the sixth embodiment is the employment of a tubular member or retainer made of synthetic resin instead of one made of metal.

Shown at 1' is a generally tubular main body of a tandem type master cylinder, which is similar to that of the first embodiment and which also receives therein a primary piston 2' and a secondary piston 3'. There is also provided a pressure proportioning valve 24' which can be similar to the valve 24 provided in the first embodiment. The fundamental structure and operation of the master cylinder 1' as well as the valve 24' are the same as in the first embodiment, and detailed description thereof is omitted. A retainer 70 is located between the two pistons 2', 3' and supported at the center thereof through a bolt 72 screwed into the primary piston 2'. The retainer 70 is movable with respect to the bolt 72 in the direction of the axis thereof. A plate 74 abuts against a front end of the primary piston 2' and is supported by the bolt 72. A spring 7' is compression is interposed between the plate 74 and a flange 70a of the retainer 70 and surrounds the retainer 70. The primary piston 2' receives the resilient force of the spring 7' in the rightward direction with respect to the secondary piston 3' as viewed in FIG. 19. A spring 8' in compression is also interposed between the secondary piston 3' and a closed bottom 1'b of the main body 1 and applies a rightward force against the secondary piston 3' (as viewed in FIG. 19).

A generally tubular member 6' is disposed around a part of the spring 7'. The tubular member 6' includes a radially outwardly extending flange portion 6'a at one end thereof (right end as viewed in FIG. 19) and an inwardly bent nail portion 6'b at the other end thereof (left end as viewed in FIG. 19). The tubular member 6' is fitted on the secondary piston 3' with the nail portion 6'b engaging with a groove 3'a formed in the secondary piston 3'. The tubular member 6' functions in a manner similar to the tubular retainer 6 provided in the first embodiment. In this embodiment, however, the tubular member 6 is made of synthetic resin. The whole of the tubular member 6 can be made of synthetic resin (for example Polyacetal). Alternatively, the flange portion 6'a alone can be made of synthetic resin and the remaining portion can be made of metal. In any case, the flange 6'a is adapted to smoothly slide with a suitable clearance left between the inner surface of the bore in the main body 1' and the flange 6'a.

In this embodiment, it is possible to prevent the tubular member 5' from scratching the inner surface of the bore in the main body 1' when the tubular member 6' slides in the bore so that the reliability of brake performance is increased. In connection with the above matter, it is possible to minimize the amount of eccentricity of the flange 6'a with respect to the inner diameter of the bore in the main body since the outer diameter of the flange 6'a of the tubular member can be made large enough to ensure that the flange 6'a comes into contact with the inner surface of the bore in the main body 1'. Further, it is possible to ensure a certain extent or depth of contact between the flange 6'a and a sensing end portion 43' of slider 40' and to minimize variation in the extent of contact, while this given extent of contact must be ensured so that the valve 24' may be deactivated without fail when the secondary piston 3' is displaced beyond the predetermined stroke. This fact increases the reliability of safe compensation for brake failure. When the whole of the tubular member 6' is made of synthetic resin, a simple snap-fit form of engagement can be employed for attaching the member 6' onto the secondary piston 3'. This results in the efficiency of the assembly operation being greatly improved. Further, it is possible to increase the stability of the posture of orientation of the tubular member 6' by securing the member 6' to the secondary piston 3' through such engagement means. This also results in a further increase in the reliability of safe compensation for brake failure. Furthermore, a tubular member made of synthetic resin makes it possible to decrease the weight of the product.

The description has been made with respect to some preferred embodiments of the invention, however, the invention is not limited to these embodiments and various changes or modifications may be applied. For example, the invention may be applied to a so-called X-type brake circuit wherein the first pressure chamber 4 is connected to one front wheel brake cylinder directly and to one rear wheel brake cylinder through the proportioning valve 24 and, the second pressure chamber 5 is connected to the other front wheel brake cylinder directly and to the other rear wheel brake cylinder through another proportioning valve which is generally similar to the valve 24. Further, the slide 40, 40', 50 or 50' may be formed of any desired material but, preferably, of synthetic resin such as polypropylene. Further, in all embodiments, the slide slidably moves along the outer wall of the main body 1, however, it is possible to provide a guide member separately from the main body 1.

As described heretofore, according to the invention, a failure in the front wheel brake circuit can be compensated by deactivating the pressure proportioning valve connected to the rear wheel brake circuit, and thus, it is possible to simplify the hydraulic system and to reduce the size thereof. By utilizing the slide according to the invention, it is possible to reliably deactivate the proportioning valve by a small amount of axial displacement of the slide, and thus, the amount of axial displacement of the tubular member or the piston required to deactivate the proportioning valve can be minimized as compared with prior art devices.

Further, the slide is separate from the valve member of the pressure proportioning valve, and thus, the normal operation of the valve member or the pressure proportioning valve is not affected by the slide. The amount of the sliding movement of the slide is small, and thus the axial length of the slit 23 formed in the wall of the master cylinder can be minimized, and it is possible to prevent seals mounted in the cylinder from being damaged when assembling the master cylinder. Further, the length of projecting ends 42, 43, 52 and 53 of the slide can be reduced, and thus, the strength of the slide can be improved.

What is claimed is:

1. A tandem type master cylinder for use in a vehicle hydraulic brake system, said master cylinder comprising:
    a main body having therein a bore extending along an axis of said master cylinder;
    a piston slidably received in said bore within said main body and defined a pressure chamber at least one one side thereof;
    an engaging member received in said bore and adapted to move in common with said piston;
    a pressure proportioning valve integrally connected to said main body to extend therefrom in a direction transverse to said axis, said pressure proportioning valve including a piston and a valve member adapted to align with said actuating member in series,
    said valve member having a valve portion formed on one side surface thereof and a projection formed on another side surface thereof; and
    an actuating member movably mounted in the master cylinder between said main body and said proportioning valve for sliding relative to said main body in directions parallel to said piston,
    said actuating member comprising a generally disc-shaped portion, a resilient outer circumferential portion integrally connected to said disc-shaped portion for urging the actuating member to a predetermined normal position, and a sensing end and an actuating end projecting from respectively opposite surfaces of said disc-shaped portion,
    said sensing end of the actuating member passing through an opening formed in a circumferential wall of said main body and projecting into said pressure chamber,
    said engaging member cooperating with said sensing end of said actuating member such that when said piston in the bore is displaced beyond a predetermined normal reciprocating stroke in said bore, said engaging member engages said sensing end to slide said actuating member in one of said directions from said normal position,
    said actuating end of said actuating member cooperating with said projection of said valve member such that when said actuating member is slid relative to said main body, said actuating end engages with said projection to tilt said valve member, thereby deactivating said pressure proportioning valve, and
    said resilient outer circumferential portion of the actuating member for returning said actuating member that has been slid from said normal position, in the other of said directions back to said normal position.

2. A master cylinder as claimed in claim 1, comprising primary and secondary pistons slidable in said bore, and wherein said pressure chamber is defined between said primary piston and said second piston, and said opening constitutes a passage in which pressurized liquid may flow to a rear wheel brake circuit through said pressure proportioning valve, and further comprising a tubular member connected to one of said primary piston or said secondary piston and disposed in said pressure chamber, said tubular member having a flange comprising said engaging member for cooperating with said sensing end of said actuating member.

3. A master cylinder as claimed in claim 2, wherein at least said flange of said tubular member is made of synthetic resin.

* * * * *